Oct. 7, 1969   HIDEO TAKAFUJI ET AL   3,470,739
APPARATUS FOR MEASURING THE SHAPE OF SHEET OR STRIP
Filed Sept. 7, 1967                         2 Sheets-Sheet 1

INVENTORS
Hideo Takafuji
Tsugio Ishida

By, Wenderoth, Lind & Ponack,
Attorneys

INVENTORS.
Hideo Takafuji
Tsugio Ishida 3,470,739
Patented Oct. 7, 1969

3,470,739
APPARATUS FOR MEASURING THE SHAPE OF SHEET OR STRIP
Hideo Takafuji and Tsugio Ishida, Kawasaki, Japan, assignors to Yawata Iron & Steel Co., Ltd., Tokyo, Japan, a corporation of Japan
Filed Sept. 7, 1967, Ser. No. 666,088
Claims priority, application Japan, Sept. 7, 1966, 41/59,392
Int. Cl. G01l 5/10
U.S. Cl. 73—159                              4 Claims

ABSTRACT OF THE DISCLOSURE

An apparatus for measuring the shapes of sheet-like members. The apparatus has at least one sensing means movable along the sheet-like member to be measured for sensing the gradient of the sheet relative to a datum plane at intervals. The sensing means produces a signal which is a function of the gradient. Integrating means is coupled to said sensing means for integrating the gradient signal for obtaining the waviness of the sheet-like members represented by the expression $S-L$ and the degree of waviness represented by the expression $$\frac{S-L}{L}$$

wherein S is the length of the member between two points measured along the surface thereof and L is the length of the member measured along a straight line between the two points.

---

This invention relates to a method of measuring the shape of sheet or strip.

Recently the consumption of rolled metal strip and sheet has become very high. With the progress of recent techniques, flat sheets or shaped sheets have been required more and more. It is therefore necessary to obtain products conforming to the requirements by measuring the shape of the product. However, not only are measures for quantitatively determining such bad shape, as for example, corrugation, waviness and bowing, poor, but also the methods of measuring are very empirical and primitive today.

The existing measuring methods are manual measurements with a sight or by a feel, or by a simple scale. Further, as understood with reference to FIGURE 1, as a measure for giving a quantitative expression of the shape of a rolled plate 1, the height $a$ from a standard plane 2 such as the surface of a flat plate to the peak 4 of a wave 3 is used and the steepness is represented by a ratio $\lambda = a/l$ of the height $a$ to the length $l$ between the troughs of the waves. The beginning and end of the wave length $l$ are not definite, however. Further, because there are waves of more complicated forms, the shape cannot be expressed by only the measurements such as $a$ and $\lambda$.

An object of the present invention is to provide a method wherein shape can be automatically measured without manual measurements.

Another object of the present invention is to provide a method of reasonably measuring shape of sheet with a high precision by adopting a new measurement for use in quantitative expressions and an ingenious measuring method.

This invention will be more fully understood from the following description taken in conjunction with the accompanying drawings, in which.

The present invention shall be explained more particularly in the following with reference to the drawings.

Figure 3:
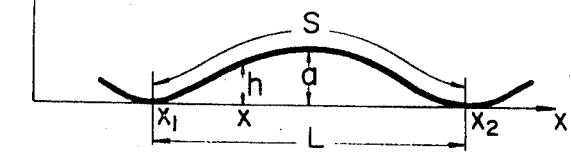
FIGURE 3 is a view explaining the measuring principle of the present invention.
Figure 4:
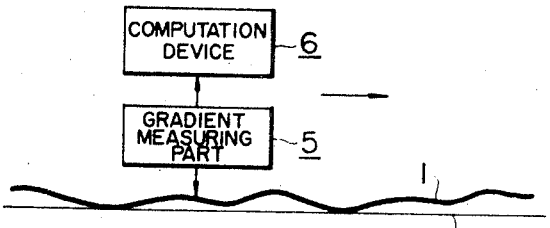
FIGURE 4 is a view of the principle of an apparatus for carrying out the present method.

As shown in FIGURE 4, in carrying out the present method, a gradient measuring part 5 and a computation device 6 are used. The length and height are not measured directly with said measuring part 5 but the gradient $\alpha$ at each point on a rolled sheet 1 relative to a datum plane 2 is measured. If said gradient $\alpha$ can be measured, as clearly shown in FIGURE 3, the wave height $a$ and steepness $\lambda$, which are known measures, can be represented by $$a = \frac{1}{2} \int_{x_1}^{x_2} \left| \frac{dh}{dx} \right| dx \qquad (A)$$

$$\lambda = \frac{1}{2L} \int_{x_1}^{x_2} \left| \frac{dh}{dx} \right| dx \qquad (B)$$

Therefore, by carrying out the integrations in the Formulas A and B above with the above-mentioned computation device 6, both $a$ and $\lambda$ can be determined. Though one wave length is shown in said drawing, needless to say, generally the integration distance is arbitrary. In such case, average $a$ and $\lambda$ over said integration distance can be determined.

In carrying out a measurement with a gradient measuring part 5, it is necessary that the rolled sheet 1 move or that, if the rolled sheet 1 is kept stationary, the apparatus including said measuring part be moved along said sheet 1. Various measuring means are shown in FIGURES 5 to 8 which can be used as said measuring part 5.

Figure 5:
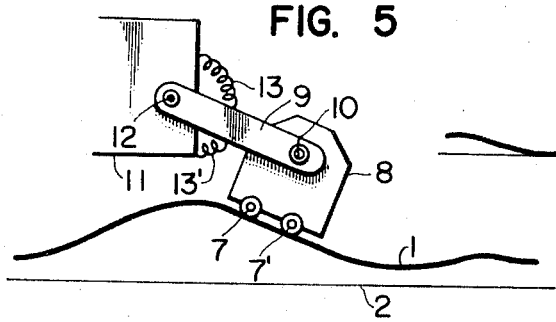
FIGURES 5 to 8 are diagrammatic side views of an apparatus for measuring the gradient of the surface of a sheet.

In FIGURE 5, a two-wheel measuring device 8 provided with wheels 7 and 7' is pivoted on a rotary shaft 10 to the forward end of a supporting arm 9 pivoted at the base end 12 to a supporting part 11 and supported by the supporting part 11 through springs 13 and 13'. The wheels 7 and 7' of the two-wheel device 8 are so made as to always follow the gradient of the rolled sheet 1. Therefore, in such case, if the angle of rotation of the rotary shaft 10 is measured, the gradient of said sheet at that point will be able to be determined.

Figure 6:
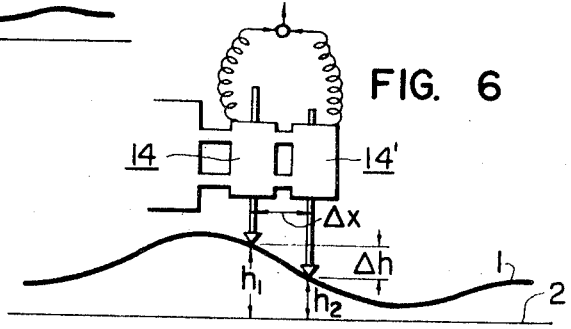

In FIGURE 6, two displacement measuring elements 14 and 14' such as, for example, differential transformers, are integrally secured at points spaced from each other by a fixed distance $\Delta x$ in the direction of movement of the rolled sheet 1 so that, when the diffference $\Delta h$ between the heights $h_1$ and $h_2$ of the displacement measuring elements 14 and 14', respectively, from the datum plane 2 is known, the gradient $$\alpha = \frac{\Delta h}{\Delta x}$$

at that point can be obtained.

Figure 7:
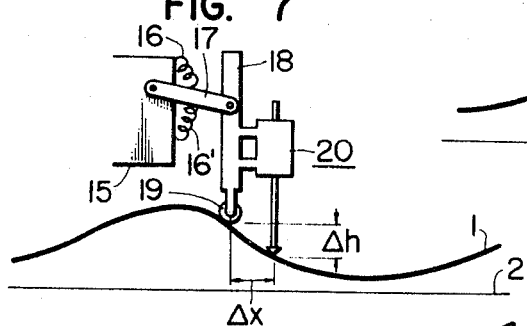

In FIGURE 7, an elevating rod 18 is provided at the forward end of a supporting arm 17 rotatably pivoted to a supporting part 15 through springs 16 and 16' so that a roller 19 at the forward end of said elevating rod 18 is free to move up and down in close contact with the surface of the rolled sheet 1. When the differential displacement $\Delta h$ of the point on the surface of the sheet spaced a distance $\Delta x$ from the roller 19 at the forward end of the elevating rod 18 is measured with a displacement measuring element 20 coupled to said rod 18, the gradient $$\alpha = \frac{\Delta h}{\Delta x}$$

can be determined.

Figure 8:
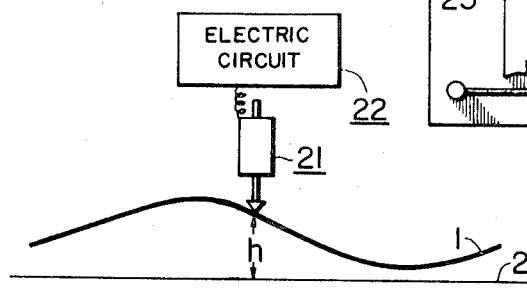

In FIGURE 8, when the height $h$ of the rolled sheet 1 above plane 2 is measured with a displacement measuring element 21 and is differentiated with respect to $x$ with an electric circuit 22, the gradient $$\alpha = \frac{dh}{dx}$$

can be obtained.

Further, the computation device 6 for carrying out the present method can be any suitable device. That is to say, in an analogue integrating system, because the integration can be carried out electrically only in a time region, for example, if the relative velocity of the measuring device and the sheet is fixed, the above mentioned integrations of $a$ and $\lambda$ will be converted from integrations in a time region and said calculation will be able to be carried out. In a digital adding system, if the measured value of the gradient is sampled whenever the above-mentioned measuring part 5 moves a distance $\Delta x i$ with respect to the sheet, the Formulas A and B will become the following Formulas A' and B' respectively, and the result will be able to be obtained by an adding calculation:

$$a = \frac{1}{2} \sum_{i=1}^{N} \left|\frac{dh}{dx}\right|_i \Delta x i \qquad (A')$$

$$\lambda = \frac{1}{2L} \sum_{i=1}^{N} \left|\frac{dh}{dx}\right|_i \Delta x i \qquad (B')$$

wherein N is the number of samples in the section L and $$L = \sum_{i=1}^{N} \Delta x i$$

Therefore, if a sampling over a fixed distance, for example, of $\Delta x i = \Delta x$ is carried out, the Formulas A' and B' will become the following Formulas A" and B", respectively; no error will come in from the sampling distance and a simple precise measurement will become possible:

$$a = \frac{\Delta x}{2} \sum_{i=1}^{N} \left|\frac{dh}{dx}\right|_i \qquad (A'')$$

$$\lambda = \frac{1}{2N} \sum_{i=1}^{N} \left|\frac{dh}{dx}\right|_i \qquad (B'')$$

In the above there has been explained a method of measuring the wave height and steepness which are conventional measures. The present invention also has as a feature the obtaining of new measurements of waviness and degree of waviness by such measuring means.

Figure 1:
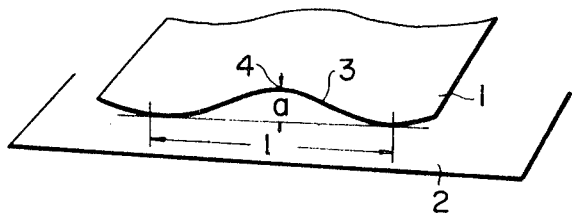
FIGURE 1 is a perspective explanatory view showing a conventional measurement of the shape of a sheet.
Figure 2:
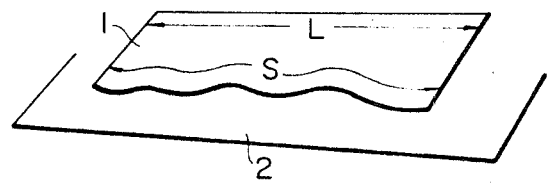
FIGURE 2 is a perspective view explaining the new measurements, waviness and degree of waviness according to the present invention.

As shown in FIGURE 2, the length S as measured along the wavy part is longer than the length L of the flat part of the sheet 1 and is considered to have become wavy. Therefore, if the magnitude of the waviness $\delta = S - L$ and the degree of waviness $$\epsilon = \frac{\delta}{L} = \frac{S - L}{L}$$

are measured in terms of L and S, the shape of said sheet will be able to be precisely determined quantitatively.

However, in fact, in ordinary rolled sheets, $S = L$. Even in a sheet having a rather bad shape, $\delta$ is so small that it is very difficult to determine $\delta$ and $\epsilon$ precisely by directly measuring S and L. But, if the gradient $\alpha$ of said sheet 1 is measured by part 5 as described above, the quantities $\delta$ and $\epsilon$ be obtained by the computation device 6 in the same manner as in the above mentioned Formulas A and B from the calculations $$\delta = \frac{1}{2} \int_{x_1}^{x_2} \left(\frac{dh}{dx}\right)^2 dx \qquad (C)$$

$$\epsilon = \frac{1}{2L} \int_{x_1}^{x_2} \left(\frac{dh}{dx}\right)^2 dx \qquad (D)$$

Formulas corresponding to the above-mentioned Formulas A', B' and A", B" which were taken from the Formulas A and B, can be shown to be as follows:

$$\delta = \frac{1}{2} \sum_{i=1}^{N} \left(\frac{dh}{dx}\right)_i^2 \Delta x i \qquad (C')$$

$$\epsilon = \frac{1}{2L} \sum_{i=1}^{N} \left(\frac{dh}{dx}\right)_i^2 \Delta x i \qquad (D')$$

$$\delta = \frac{\Delta x}{2} \sum_{i=1}^{N} \left(\frac{dh}{dx}\right)_i^2 \qquad (C'')$$

$$\epsilon = \frac{1}{2N} \sum_{i=1}^{N} \left(\frac{dh}{dx}\right)_i^2 \qquad (D'')$$

Figure 9:
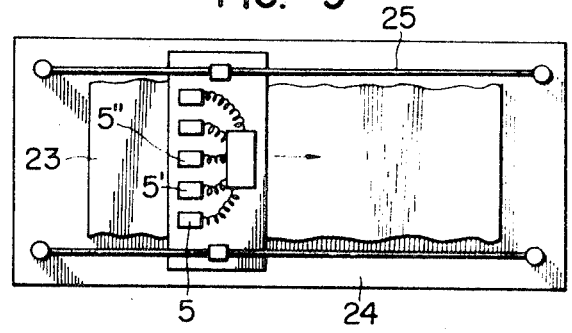
FIGURE 9 is a plan view of an embodiment of an apparatus for carrying out the method of the present invention.
Figure 10:
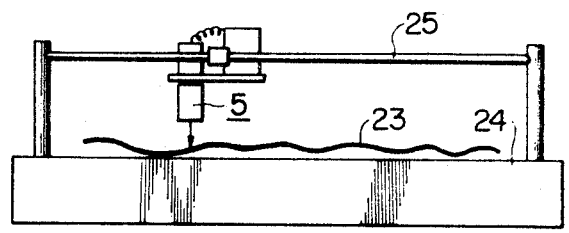
FIGURE 10 is a side view of the same.
Figure 11A:
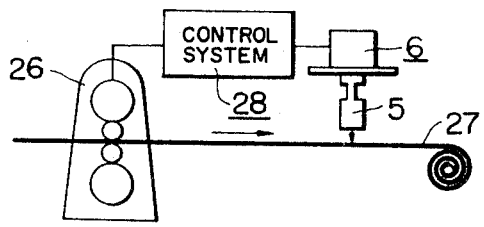
FIGURES 11A and 11B are diagrammatic views showing means of controlling a rolling mechanism as a result of the detection by the method of the present invention, FIGURE 11A being a side view, and FIGURE 11B being a transverse view.
Figure 11B:
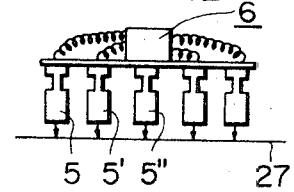

An embodiment of the present invention as used to measure the shape of a sheet product is shown in FIGURES 9 and 10 in which, if a sheet 23 is placed on a standard flat plate 24, a plurality of gradient measuring parts 5, 5', 5" . . . positioned in the direction of the width of the sheet are moved in the longitudinal direction by means of a moving device 25, the gradient at each point on said sheet can be measured and $a$, $\lambda$, $\delta$ and $\epsilon$ can be calculated with the computation device 6, so that the shape of the sheet can be quantitatively determined and automatically examined and classified. Therefore, if, for example, the degree of waviness $\epsilon$ in the width direction is compared, a quantitative expression such as the edge waviness or waviness at the middle can be exposed. Further, by utilizing the present method, as shown in FIGURES 11A and B, in a strip rolling process 26, if a proper number of gradient measuring parts 5, 5', 5" . . . are arranged in the direction of the width of the strip on the outlet side of the roll, the gradient at each point is measured during the running of the strip 27 and the degree of waviness is calculated in the computation device 6, it will be possible to detect the shape of the strip 27 being rolled, to feed said detected information back to the control system 28 of the rolling stand, to thereby automatically adjust the rolling force or the bending force of the roll and to control the shape of the strip 27 during rolling.

An example of the present invention is as follows:

The shape of a sheet product was detected by using the gradient measuring part 5 shown in FIGURE 6 and utilizing differential transformers for the displacement measuring elements 14 and 14'. When $\Delta x = 10$ mm., the measurement precision of $h_1$ and $h_2$ was 1/100 mm.

Figure 12:
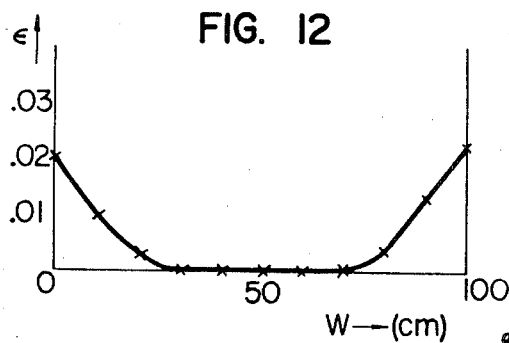
FIGURE 12 is a diagram showing the results of experiments using the method of the present invention.

The degree of waviness $\epsilon$ was calculated with a digital system, and it could be computed to the order of 1/1,000,000. Further, in fact, when gradient measuring parts were provided at intervals of 10 cm. in the direction of the width (W) of a sheet of a width of 1 m. and a length of 2 m. and the degree of waviness ϵ was measured over the length of 2 m., measurement results as shown in FIGURE 12 were obtained. It could thereby be confirmed that said sheet was flat in the middle part but was wavy in the edge part.

The present invention has been explained in the above mostly with respect to rolled metal sheet or strip. However, it is of course possible that the shapes of such things as synthetic resin, celluloid and wood can also be measured by the method of the present invention.

What is claimed is:

1. An apparatus for measuring the shapes of sheet-like members, comprising at least one sensing means movable along the sheet-like member to be measured for sensing the gradient of the sheet relative to a datum plane at intervals and producing a signal which is a function of the gradient, and integrating means coupled to said sensing means for integrating the gradient signal for obtaining the waviness of the sheet-like members represented by the expression $S-L$ and the degree of waviness represented by the expression $$\frac{S-L}{L}$$

wherein S is the length of the member between two points measured along the surface thereof and L is the length of the member measured along a straight line between the two points.

2. An apparatus for measuring the shapes of sheet-like members as claimed in claim 1 in which said integrating means has the capability of integrating the signals representative of the gradients sensed according to the formula $$\delta = \frac{1}{2} \int_{x_1}^{x_2} \left(\frac{dh}{dx}\right)^2 dx$$

wherein $\delta$ is the waviness, $x_1$ and $x_2$ are the points between which measurements are made, $x$ is distance along the member parallel to the datum plane and H is the distance above the datum plane.

3. An apparatus for measuring the shapes of sheet-like members as claimed in claim 1 in which said integrating means has the capability of integrating the signals representative of the gradients sensed according to the formula $$\epsilon = \frac{1}{2L} \int_{x_1}^{x_2} \left(\frac{dh}{dx}\right)^2 dx$$

wherein $\epsilon$ is the degree of waviness, $x_1$ and $x_2$ are the points between which measurements are made, $x$ is distance along the member parallel to the datum plane and $h$ is the distance above the datum plane.

4. An apparatus for measuring the shapes of sheet-like members as claimed in claim 1 in which there are a plurality of said gradient sensing means spaced at intervals across the width of the sheet-like member, and said integrating means has the capability of integrating the signals representative of the gradients sensed according to the formula $$\epsilon = \frac{1}{2L} \int_{x_1}^{x_2} \left(\frac{dh}{dx}\right)^2 dx$$

wherein $\epsilon$ is the degree of waviness, $x_1$ and $x_2$ are the points between which measurements are made, $x$ is distance along the member parallel to the datum plane and $h$ is the distance above the datum plane, whereby the profile of the degree of waviness of the sheet-like member transversely of the sheet-like member can be obtained.

References Cited

UNITED STATES PATENTS

| | | | |
|---|---|---|---|
| 2,344,217 | 3/1944 | Reason et al. | 73—10 |
| 2,460,726 | 2/1949 | Arndt | 73—10 |
| 2,674,127 | 4/1954 | Garrett et al. | 73—15 |
| 3,056,209 | 10/1962 | Oliver | 33—17 |
| 3,087,329 | 4/1963 | Vongrodek et al. | 73—10 |
| 3,266,302 | 8/1966 | Spangler et al. | 73—10 |
| 3,334,508 | 8/1967 | Martin | 73—159 X |
| 3,357,238 | 12/1967 | Musante et al. | 73—10 |
| 3,377,828 | 4/1968 | Harmon | 73—105 X |

OTHER REFERENCES

Technical Bulletins: "Surface Texture, Surface Measurement"; Micrometrical Co.; received November 1963

LOUIS R. PRINCE, Primary Examiner

J. NOLTON, Assistant Examiner

U.S. Cl. X.R.

33—174; 73—105